United States Patent
Lin

(10) Patent No.: US 10,759,448 B2
(45) Date of Patent: Sep. 1, 2020

(54) METHOD AND APPARATUS FOR EARLY WARNING OF VEHICLE OFFSET

(71) Applicant: BOE Technology Group Co., Ltd., Beijing (CN)

(72) Inventor: Hangdong Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/383,554

(22) Filed: Apr. 12, 2019

(65) Prior Publication Data
US 2020/0101983 A1    Apr. 2, 2020

(30) Foreign Application Priority Data
Sep. 30, 2018    (CN) .......................... 2018 1 1161132

(51) Int. Cl.
| | |
|---|---|
| *B60Q 1/26* | (2006.01) |
| *B60W 50/14* | (2020.01) |
| *G06T 7/70* | (2017.01) |
| *G06K 9/00* | (2006.01) |
| *G08G 1/16* | (2006.01) |

(52) U.S. Cl.
CPC ......... *B60W 50/14* (2013.01); *G06K 9/00798* (2013.01); *G06T 7/70* (2017.01); *G08G 1/167* (2013.01); *B60W 2050/143* (2013.01); *G06T 2207/30256* (2013.01)

(58) Field of Classification Search
CPC .................................................. B60W 50/74
USPC ....... 340/463, 435, 436, 438, 903, 907, 933, 340/937; 701/28, 41, 301, 302
See application file for complete search history.

(56) References Cited

U.S. PATENT DOCUMENTS

| | | | | |
|---|---|---|---|---|
| 7,382,236 | B2 * | 6/2008 | Maass | B60Q 1/346 340/436 |
| 7,561,032 | B2 * | 7/2009 | Huang | B60Q 9/008 340/435 |
| 9,077,958 | B2 * | 7/2015 | Gupta | G06K 9/00798 |
| 2002/0095246 | A1 * | 7/2002 | Kawazoe | B62D 15/025 701/1 |
| 2006/0106518 | A1 | 5/2006 | Stam et al. | |

(Continued)

FOREIGN PATENT DOCUMENTS

| | | |
|---|---|---|
| CN | 102303609 A | 1/2012 |
| CN | 104077756 A | 10/2014 |

(Continued)

OTHER PUBLICATIONS

Lei Guo et al., "Lane Detection Method by Using Steerable Filters," Chinese Journal of Mechanical Engineering, vol. 44, No. 8, pp. 214-226 (Aug. 2008).

(Continued)

*Primary Examiner* — Tai T Nguyen
(74) *Attorney, Agent, or Firm* — McDermott Will & Emery LLP

(57) ABSTRACT

The present disclosure provides a method and apparatus for early warning of vehicle offset. The method includes: acquiring collected road image to be detected; obtaining a corresponding grayscale image by performing grayscale processing on the road image to be detected; determining a target lane line within the grayscale image; and determining whether to issue an early warning of vehicle offset according to the target lane line and an early warning trigger condition.

12 Claims, 3 Drawing Sheets

(56) References Cited

U.S. PATENT DOCUMENTS

| | | |
|---|---|---|
| 2018/0178785 A1 | 6/2018 | Lin et al. |
| 2018/0204075 A1 | 7/2018 | Kumano et al. |
| 2018/0273051 A1* | 9/2018 | Amato ................ B60W 10/20 |

FOREIGN PATENT DOCUMENTS

| | | |
|---|---|---|
| CN | 104978562 A | 10/2015 |
| CN | 105151049 A | 12/2015 |
| CN | 105730451 A | 7/2016 |
| CN | 105966398 A | 9/2016 |
| CN | 107292214 A | 10/2017 |
| CN | 108297867 A | 7/2018 |
| EP | 2930657 A1 | 10/2015 |

OTHER PUBLICATIONS

Office Action issued in corresponding Chinese Patent Application No. 201811161132.7, dated Apr. 10, 2020.

\* cited by examiner

METHOD AND APPARATUS FOR EARLY WARNING OF VEHICLE OFFSET

CROSS-REFERENCE TO RELATED APPLICATION(S)

This application claims priority to the Chinese Patent Application No. CN201811161132.7, filed on Sep. 30, 2018, entitled "METHOD AND APPARATUS FOR EARLY WARNING OF VEHICLE OFFSET", which is incorporated herein by reference in its entirety.

TECHNICAL FIELD

The present disclosure relates to the field of automatic control, and more particularly, to a method and apparatus for early warning of vehicle offset.

BACKGROUND

ADAS is also known as an advanced driver assistance system, which assists drivers in driving using a variety of sensors such as cameras, laser radars etc. The ADAS has been widely used in vehicles to sense surrounding environments when the vehicles are running, identify driving scenes and lane lines, perform object detection and tracking, etc., and even perform systematic analysis in combination with map navigation data, a Global Positioning System (GPS) etc., so as to predict possible dangers, and provide drivers with convenient transportation information etc.

The existing lane identification technology is usually based on a specific environment. For example, in a data test set, roads are relatively clean, light is even, and lane lines are not covered by vehicles. However, in a changing road environment, lane lines may not be accurately identified, which may increase a frequency of false warnings and false detections, thereby increasing the risk of occurrence of dangers when vehicles are running.

SUMMARY

The present disclosure discloses a method applied to a vehicle for early warning of vehicle offset, the method comprising: acquiring collected road image to be detected; obtaining a corresponding grayscale image by performing grayscale processing on the road image to be detected; determining a target lane line within the grayscale image; and determining whether to issue an early warning of vehicle offset according to the target lane line and an early warning trigger condition.

In some embodiments, in the step of determining a target lane line within the grayscale image comprises: determining a near field-of-view region of the grayscale image; extracting a lane line feature image of the near field-of-view region; obtaining the target lane line by fitting lane line features in the lane line feature image; and acquiring a target lane line angle.

In some embodiments, the step of extracting a lane line feature image in the near field-of-view region comprises: obtaining a near field-of-view image by intercepting the near field-of-view region of the grayscale image; and extracting, through a steerable filter, the lane line feature image in the near field-of-view image.

In some embodiments, the step of extracting, through a steerable filter, a lane line feature image in the near field-of-view image when the road image to be detected is a first frame image comprises: processing the near field-of-view image to generate a gradient image; acquiring multiple feature angles within the gradient image; and inputting the multiple feature angles into the steerable filter, and processing the near field-of-view image by the steerable filter to obtain the lane line feature image.

In some embodiments, the step of extracting, through a steerable filter, a lane line feature image in the near field-of-view image when the road image to be detected is not the first frame image comprises: acquiring a target lane line angle acquired according to a road image to be detected in a previous frame; and inputting the target lane line angle of the road image to be detected in the previous frame into the steerable filter, and processing the near field-of-view image by the steerable filter to obtain the lane line feature image.

In some embodiments, the step of determining whether to issue an early warning of vehicle offset according to the target lane line and an early warning trigger condition comprises: determining a first distance between the vehicle and the target lane line according to the target lane line; and issuing the early warning of vehicle offset when the first distance satisfies a first threshold distance condition.

In some embodiments, after the step of determining a target lane line within the grayscale image, the method further comprises: extracting multiple feature points in the grayscale image; inputting the multiple feature points into a preset detector to determine entity object information; and determining a second distance between the vehicle and an entity object according to the entity object information, and issuing the early warning of vehicle offset when the second distance satisfies a second threshold distance condition.

In some embodiments, the step of acquiring a road image to be detected comprises: collecting the road image to be detected using an advanced driver assistance system.

The embodiments of the present disclosure further disclose an apparatus for early warning of vehicle offset applied to a vehicle, the apparatus comprising: a road image acquisition module configured to acquire collected road image to be detected from a sensor; a grayscale image processing module configured to obtain a corresponding grayscale image by performing grayscale processing on the road image to be detected; a target lane line determination module configured to determine a target lane line within the grayscale image; and an offset early warning module configured to determine whether to issue an early warning of vehicle offset according to the target lane line and an early warning trigger condition.

In some embodiments, the target lane line determination module comprises a near field-of-view region determination sub-module configured to determine a near field-of-view region of the grayscale image; a feature image extraction sub-module configured to extract a lane line feature image of the near field-of-view region; a target lane line acquisition sub-module configured to obtain the target lane line by fitting lane line features in the lane line feature image, and a target lane line angle acquisition sub-module configured to acquire a target lane line angle.

In some embodiments, the feature image extraction sub-module comprises a near field-of-view image interception sub-module configured to obtain a near field-of-view image by intercepting the near field-of-view region of the grayscale image; and a lane line feature image extraction sub-module configured to extract, through a steerable filter, the lane line feature image in the near field-of-view image.

In some embodiments, when the road image to be detected is a first frame image, the lane line feature image extraction sub-module comprises a gradient image generation sub-module configured to process the near field-of-view image to generate a gradient image; a feature angle acquisition sub-module configured to acquire multiple feature angles within the gradient image; and a first lane line image acquisition sub-module configured to input the multiple feature angles into the steerable filter, and process the near field-of-view image by the steerable filter to obtain the lane line feature image.

In some embodiments, when the road image to be detected is not the first frame image, the lane line feature image extraction sub-module comprises a target lane line angle acquisition sub-module configured to acquire a target lane line angle acquired according to a road image to be detected in a previous frame; and the first lane line feature image acquisition sub-module configured to input the target lane line angle into the steerable filter, and process the near field-of-view image by the steerable filter to obtain the lane line feature image.

In some embodiments, the offset early warning module comprises a first distance determination sub-module configured to determine a first distance between the vehicle and the target lane line according to the target lane line; and a first offset early warning sub-module configured to issue the early warning of vehicle offset when the first distance satisfies a first threshold distance condition.

In some embodiments, the apparatus further comprises a feature point extraction module configured to extract multiple feature points in the grayscale image; an entity object determination module configured to input the multiple feature points into a preset detector to determine entity object information; and a second offset early warning sub-module configured to determine a second distance between the vehicle and an entity object according to the entity object information, and issue the early warning of vehicle offset when the second distance satisfies a second threshold distance condition.

The embodiments of the present disclosure further disclose a vehicle, comprising: a photographing apparatus configured to collect a road image to be detected; a processor; and a memory having stored thereon instructions executable by the processor, wherein the processor is configured to perform any method for early warning of vehicle offset described above.

BRIEF DESCRIPTION OF THE ACCOMPANYING DRAWINGS

DETAILED DESCRIPTION

In order to make the above-described purposes, features and advantages of the present disclosure more apparent and understandable, the present disclosure will be described in detail below in conjunction with accompanying drawings and specific embodiments. However, it is to be illustrated that the following detailed description is only for the illustrative description of the present disclosure, instead of limiting the present disclosure in any way. In addition, it should be illustrated that various features described in the different embodiments may be combined to form new embodiments in appropriate conditions, or certain features may be replaced or removed in some embodiments to form new embodiments, and the present disclosure is therefore not limited to the embodiments described below.

Figure 1:
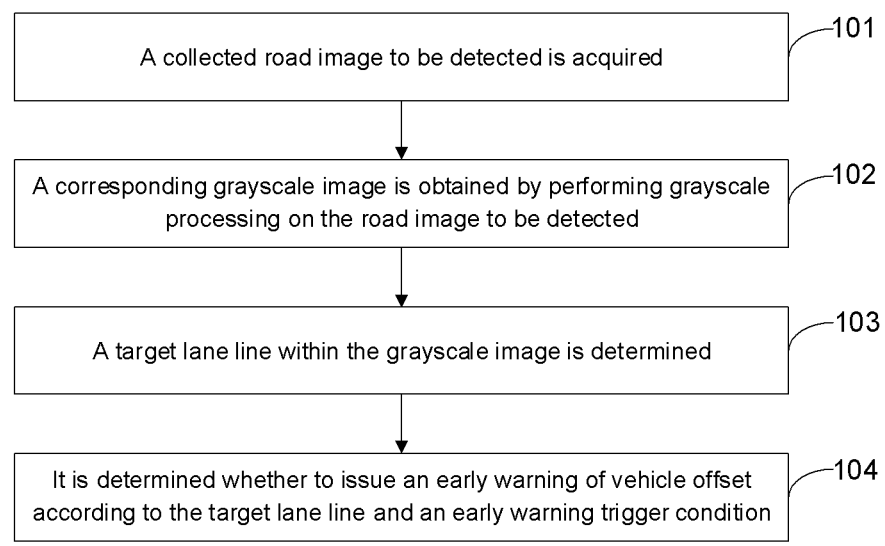
FIG. 1 illustrates a flowchart of steps of a method for early warning of vehicle offset according to an embodiment of the present disclosure.

With reference to FIG. 1, illustrated is a flowchart of steps of a method for early warning of vehicle offset according to an embodiment of the present disclosure. In some embodiments, the method for early warning of vehicle offset may be applied to a vehicle. However, the present disclosure is not limited thereto. In some other embodiments, the method may be applied to any device, apparatus, instrument, etc. which needs to be manipulated, driven, steered, for example, a robot, a ship, an aircraft, etc. The method may specifically comprise the following steps.

In step 101, a collected road image to be detected is acquired.

In the embodiment of the present disclosure, the vehicle may be a family car, a truck, a bus, etc., or any vehicle, robot, etc. which may run, and the present disclosure is not limited thereto, and the terms may be used interchangeably herein.

A camera apparatus may be pre-mounted on the vehicle to collect a road image around the vehicle (for example, in the front of, on the left of, on the right of, behind the vehicle etc.) in real time when the vehicle is running to obtain the road image to be detected.

In some embodiments of the present disclosure, the camera apparatus may be an image sensor of an ADAS. The ADAS may assist a driver in driving using a variety of sensors mounted in the vehicle. For example, the ADAS senses a surrounding environment, collects data, identifies static and/or dynamic objects, performs detection and tracking on the static and/or dynamic objects, and performs systematic calculation and analysis in combination with map data of a navigator at any time when the vehicle is running, so as to cause the driver to notice possible dangers in advance and effectively increase the comfort and safety of the driving.

Of course, in practical applications, those skilled in the art may also use other apparatuses to collect the road image to be detected, which is not limited in the present disclosure.

After the road image to be detected is acquired, step 102 is performed.

In step 102, a corresponding grayscale image is obtained by performing grayscale processing on the road image to be detected.

After the road image to be detected is obtained, the road image to be detected having, for example, a Red, Green, Blue (RGB) three-channel image format may be converted into a grayscale image. Thereby, grayscale processing of the road image to be detected is completed, to obtain the corresponding grayscale image.

It can be understood that a solution of performing grayscale processing on the road image to be detected may be performed using any of a variety of techniques. In fact, any solution which may be used to perform grayscale processing on the road image to be detected may be applied to the present disclosure as appropriate, and will not be described in detail here in the embodiments of the present disclosure.

In practical applications, any solution which may be used to convert the road image to be detected into a grayscale image may be applied to the present disclosure, and is not limited in the embodiments of the present disclosure.

After the grayscale image is obtained, step 103 may be performed.

In step 103, a target lane line within the grayscale image is determined.

In the embodiment of the present disclosure, after the grayscale image is obtained, a target lane line may be extracted from the grayscale image according to a preset algorithm, for example, one or more of an edge distribution function, a steerable filter, etc., which will be specifically described in detail below, and details thereof will not be described here again.

In some of the embodiments of the present disclosure, the above step 103 may comprise the following steps.

In step M1, multiple feature points in the grayscale image are extracted.

In step M2, the multiple feature points are input into a preset detector to determine entity object information.

In step M3, a second distance between the vehicle and an entity object is determined according to the entity object information, and an early warning of vehicle offset is issued when the second distance satisfies a second threshold distance condition.

In the embodiment of the present disclosure, the entity object refers to a physical object such as another vehicle, a pedestrian, etc. appearing in the road image to be detected, and the entity object information may be information of a distance between the other vehicle and the current vehicle, a distance between the pedestrian and the current vehicle, etc.

Specifically, after grayscale processing is performed on the image to be detected to obtain a corresponding grayscale image, features in the grayscale image may be extracted and input into a pre-trained vehicle pedestrian detector, so as to determine information of the entity object in the grayscale image.

The preset detector may be a vehicle pedestrian detector or other detectors, which is not limited in the embodiments of the present disclosure.

After the grayscale image is acquired, multiple feature points in the grayscale image may be extracted, and then the extracted multiple feature points are input into the preset detector, so that confidence and position values which are detected for different target entities may be generated, and coordinates of the target entities (i.e., vehicles and/or pedestrians) in the world coordinate system are determined in combination with parameters calibrated by a monocular camera on the vehicle, so as to determine position information of the target entities.

After a position of each entity object in the grayscale image is determined, a position of the entity object in the world coordinate system may be calculated in combination with a camera apparatus mounted on the vehicle, so as to determine a second distance between the entity object and the vehicle.

When the second distance satisfies a second threshold distance condition, an early warning of vehicle offset is issued. Specifically, when the second distance is less than a second threshold distance, the early warning of vehicle offset may be issued. For example, if the second threshold distance is 3 m, when the second distance between the entity object and the vehicle is 4 m, no early warning is issued, and when the second distance between the entity object and the vehicle is 2 m, an early warning of vehicle offset is issued.

The early warning may be issued in a specific warning sound, or a whistle, etc., which may be set by those skilled in the art according to practical situations, and is not limited in the embodiments of the present disclosure.

After the target lane line within the grayscale image is determined, step 104 is performed.

In step 104, it is determined whether to issue an early warning of vehicle offset according to the target lane line and an early warning trigger condition.

An early warning trigger condition is also preset in the system, and the early warning trigger condition may be a first threshold distance condition, that is, a condition that a distance between the target lane line and the vehicle needs to be met, which will be specifically described in detail below, and details thereof will not be described here again.

With the method for early warning of vehicle offset according to the embodiments of the present disclosure, a collected road image to be detected is acquired, grayscale processing is performed on the road image to be detected to obtain a corresponding grayscale image, a target lane line in the grayscale image is determined, and it is determined whether to issue an early warning of vehicle offset according to the target lane line and an early warning trigger condition. Compared with other technical solutions, a target lane line in a running environment of the vehicle is considered in the embodiments of the present disclosure, which increases the accuracy of identification of lane lines in subsequent lane line identification, and reduces the frequency of false alarms and false detections, thereby reducing the risk of occurrence of dangers when the vehicle is running.

Figure 2:
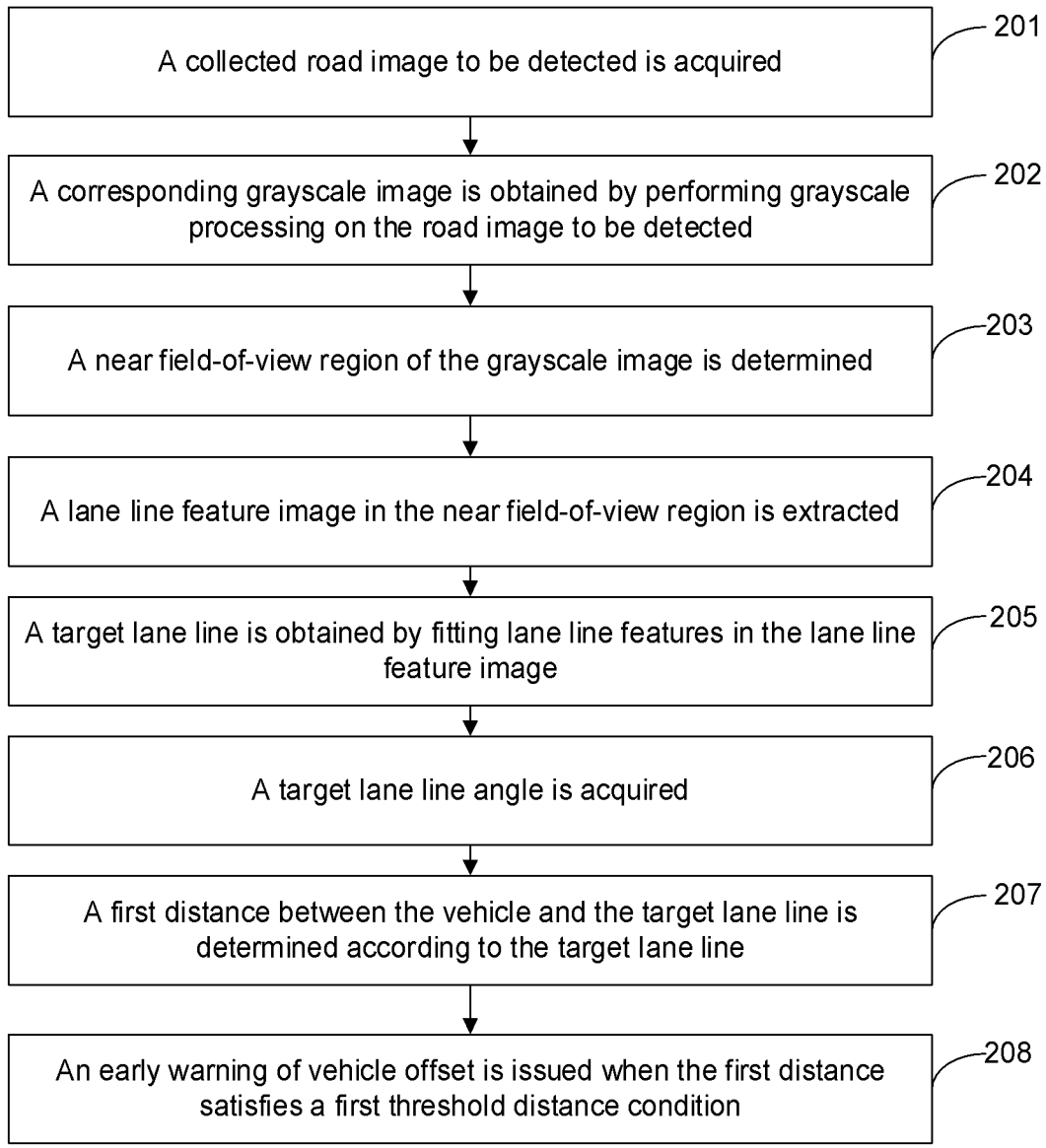
FIG. 2 illustrates a flowchart of steps of a method for early warning of vehicle offset according to an embodiment of the present disclosure.

With reference to FIG. 2, illustrated is a flowchart of steps of a method for early warning of vehicle offset according to an embodiment of the present disclosure. In some embodiments, the method for early warning of vehicle offset may be applied to a vehicle, but is not limited thereto. Specifically, the method may comprise the following steps.

In step 201, a collected road image to be detected is acquired.

In step 202, a corresponding grayscale image is obtained by performing grayscale processing on the road image to be detected.

In the embodiment of the present disclosure, specific implementations of the above steps 201 to 202 are similar to those of steps 101 to 102 in the above embodiment, and will not be described in detail here in the embodiment of the present disclosure.

After the grayscale image is obtained, step 203 may be performed.

In step 203, a near field-of-view region of the grayscale image is determined.

In the embodiment of the present disclosure, the near field-of-view region in the grayscale image is artificially set as, for example, a near field-of-view region within 10 meters from the front of the vehicle. If there are other vehicles or pedestrians appearing within 10 meters from the front of the vehicle, for example, other vehicles are detected at 5 meters from the front of the vehicle, the near field-of-view region is scaled down to a region within 5 meters from the front of the vehicle, that is, the region within 5 meters from the front of the vehicle is determined as the near field-of-view region. In general, vehicles and pedestrians have the highest priority, and the distance from the front of the vehicle should be selected to firstly meet the requirements that there is no vehicle and pedestrian within the near field-of-view region.

After the near field-of-view region of the grayscale image is determined, step 204 is performed.

In step 204, a lane line feature image in the near field-of-view region is extracted.

After the near field-of-view region of the grayscale image is determined, a lane line feature image is extracted from the near field-of-view region of the grayscale image.

A solution of extracting the lane line feature image from the near field-of-view region will be described in detail in the following embodiments.

In some of the embodiments of the present disclosure, the above step 204 may comprise the following sub-steps.

In sub-step N1, a near field-of-view image is obtained by intercepting the near field-of-view region of the grayscale image.

In sub-step N2, a lane line feature image in the near field-of-view image is extracted by a steerable filter.

In the embodiment of the present disclosure, after the near field-of-view region in the grayscale image is determined, the grayscale image may be intercepted, that is, the near field-of-view region corresponding to the grayscale image is intercepted to obtain a near field-of-view image comprising only the near field-of-view region.

A steerable filter is preset in the system, and the steerable filter may consist of two groups of two-dimensional first-order Gaussian function base filters, and may specifically be expressed using the following formulas:

$$G(x,y) = \exp(-(x^2+y^2)) \tag{1}$$

$$G_x = -2x^* \exp(-(x^2+y^2)) \tag{2}$$

$$G_y = -2y^* \exp(-(x^2+y^2)) \tag{3}$$

$$G^\theta = G_x \cos\theta + G_y \sin\theta \tag{4}$$

where $G(x,y)$ is a two-dimensional Gaussian function, $G_x$ and $G_y$ are two-dimensional first-order Gaussian functions, wherein $G_x$ is a base filter in a direction of 0 degrees and $G_y$ is a base filter in a direction of 90 degrees, $\theta$ is an input angle, and $G^\theta$ is an output steerable filter kernel. Left and right groups of lane lines in the near field-of-view image are extracted using different input angles respectively, so that a lane line feature image in the near field-of-view image may be obtained.

Of course, before the lane line feature image in the near field-of-view image is extracted by the steerable filter, it is also required to perform calculation to determine whether the road image to be detected is a first frame image, and when the road image to be detected is the first frame image, identify each feature point in the near field-of-view image, and perform statistics on gradients of various feature points to obtain two groups of target lane line angles. That is, calculation and processing may be performed for each feature point in the near field-of-view image using an edge distribution function in the related art, so as to extract the corresponding lane line feature image. A specific calculation process will not be described in detail in the embodiments of the present disclosure.

In some of the embodiments of the present disclosure, when the road image to be detected is the first frame image, the above sub-step N2 may comprise the following sub-steps.

In sub-step S1, the near field-of-view image is processed to generate a gradient image.

In the embodiment of the present disclosure, after the near field-of-view image is obtained, the near field-of-view image may further be processed correspondingly, to generate a gradient image. Specifically, a process of generating the gradient image may be performed with reference to the following example.

Assuming that there is an original image X with a size of 400*400, is a value at a pixel point on an $i^{th}$ row and a $j^{th}$ column in the image, and a corresponding gradient image is Y (400*400), then $$y_{ij} = \sqrt{[x(i,j)-x(i+1,j)]^2+(x(i,j+1))^2]} \tag{5}$$

where $y_{ij}$ is a value at a pixel point in the gradient image Y, and a gradient angle corresponding to the point is:

$$\theta = \tan^{-1}\left(\frac{x(i,j)-x(i,j+1)}{x(i,j)-x(i+1,j)}\right). \tag{6}$$

Then, statistics is performed on 1600000 (400*400) gradient angles of the entire image, to obtain numbers of gradient angles which are equal to 0 degree, 1 degree, 2 degrees, 3 degrees, ..., and 180 degrees, respectively. Then, gradients of the image are obtained, that is, gradient components of the image in x and y directions of the image are obtained respectively using a difference method, and then a gradient image of the image may be obtained using sqrt (x.^2+y.^2).

The technique of processing the image to generate the gradient image may be any of multiple techniques in the related art. As long as a method may convert a corrected near field-of-view image into a gradient image, the method may be applied to the present disclosure, which will not be described in detail here in the embodiments of the present disclosure.

Of course, in some embodiments of the present disclosure, before the gradient image is generated, gamma adaptive correction may be performed on the near field-of-view image, and the corrected near field-of-view image may then be processed as described in the above examples to generate a gradient image.

After the gradient image is generated, sub-step S2 is performed.

In sub-step S2, multiple feature angles within the gradient image are acquired.

After the gradient image is generated, statistics may be performed on gradient magnitude values within the gradient image, and multiple gradient direction angles may be acquired according to the gradient magnitude values. Various gradient direction angles are then normalized to generate a feature image. That is, after multiple gradient direction angles are acquired, various gradient direction angles may be normalized to generate a feature image.

It can be understood that the technique of normalizing the gradient direction angles to generate the feature image may be any of techniques in the related art, which will not be described in detail here in the embodiments of the present disclosure.

After the feature image is acquired, multiple feature angles in the feature image may be acquired, and then sub-step S3 is performed.

In sub-step S3, the multiple feature angles are input into the steerable filter, and the near field-of-view image is processed by the steerable filter to obtain the lane line feature image.

The identified multiple feature angles in the feature image are input into the steerable filter, to acquire the lane line feature image in the near field-of-view image.

Specifically, the above feature angles are target lane line angles. After two groups of target lane line angles in the near field-of-view image are obtained, the two groups of target lane line angles may be input into the steerable filter, that is, the two groups of target lane line angles are substituted into the above formulas (1)-(4), to obtain the lane line feature image.

In some other embodiments of the present disclosure, when the road image to be detected is not the first frame image, the above sub-step N2 may comprise the following sub-steps.

In sub-step P1, target lane line angles acquired according to a road image to be detected in a previous frame are acquired.

In sub-step P2, the target lane line angles are input into the steerable filter, and the near field-of-view image is processed by the steerable filter to obtain the lane line feature image.

In the embodiment of the present disclosure, when the road image to be detected is not the first frame image, for example, when the road image to be detected is a second frame image, a fifth frame image, etc., target lane line angles acquired according to a road image to be detected in a previous frame which is adjacent to the current road image to be detected may further be acquired. A process of acquiring the target lane line angles may be performed as follows.

After the lane line feature image is extracted from the road image to be detected in the previous frame, a lane line feature point image in the foreground is further separated from the background using the Otsu threshold algorithm. The road image to be detected in the previous frame is binarized to obtain a corresponding binarized image, Hough polar coordinate space transformation is performed on the binarized image to detect a voting peak value, and polar coordinate parameters such as a polar axis p and a deflection angle θ of a Hough line are acquired using a look-up table method. Then, the polar coordinate parameters such as the polar axis p and the deflection angle θ are input into the steerable filter, to obtain a lane line feature image in the current near field-of-view image.

In some embodiments of the present disclosure, only a road image to be detected in a first frame may be processed using an edge distribution function, and for each of subsequent near field-of-view images, a lane line deflection angle may be acquired by a voting pool combined with a Hough polar coordinate space, and is used as an angle input into the steerable filter. The edge distribution function is only enabled in a preliminary image started by the ADAS or when Hough lane line detection fails. It is not necessary to perform calculation using the edge distribution function every time a lane line feature image is acquired. In a case that a subsequent image is not the first frame image, two matrices are acquired by the steerable filter by directly using target lane line angles acquired according to a road image to be detected in a previous frame as an input, to obtain the lane line feature image, which greatly reduces the calculation amount of the overall system and improves the operation performance.

After the lane line feature image in the near field-of-view region is extracted, step 205 is performed.

In step 205, a target lane line is obtained by fitting lane line features in the lane line feature image.

In step 206, a target lane line angle is acquired.

In the embodiment of the present disclosure, the lane line features in the lane line feature image may be fitted using a straight line fitting method, to obtain a near field-of-view fitted lane line.

After the target lane line in the lane line feature image is acquired, a corresponding target lane line angle may further be acquired based on the lane line features. A solution of acquiring the target lane line angle may be any of various techniques in the related art, which will not be described in detail here in the embodiment of the present disclosure.

Of course, in practical applications, other methods may also be used by those skilled in the art to fit the lane line features, which is not limited in the embodiment of the present disclosure.

After the target lane line is obtained, step 207 is performed.

In step 207, a first distance between the vehicle and the target lane line is determined according to the target lane line.

In step 208, an early warning of vehicle offset is issued when the first distance satisfies a first threshold distance condition.

In the embodiment of the present disclosure, the first threshold distance may be a preset distance threshold, which may be 3 m, 2 m, etc., and is not limited in the present disclosure.

After the target lane line is obtained, a first distance between the vehicle and the target lane line may further be calculated, that is, a distance between a leftmost/rightmost side of the vehicle and a near field-of-view fitted lane line when the vehicle is running may further be calculated, and an early warning of vehicle offset is issued when the first distance between the vehicle and the target lane line is greater than the first threshold distance. For example, if the first threshold distance is 3 m, when the distance between the vehicle and the target lane line is 4 m, an early warning of vehicle offset is issued; and when the distance between the vehicle and the target lane line is 2 m, no early warning of vehicle offset is issued.

In the method for early warning of vehicle offset according to the embodiments of the present disclosure, a collected road image to be detected is acquired, grayscale processing is performed on the road image to be detected to obtain a corresponding grayscale image, a target lane line in the grayscale image is determined, and it is determined whether to issue an early warning of vehicle offset according to the target lane line and an early warning trigger condition. Compared with the technical solutions in the related art, in the embodiments of the present disclosure, a target lane line in a running environment of the vehicle is considered in the embodiments of the present disclosure, which increases the accuracy of identification of lane lines in subsequent lane line identification, and reduces the frequency of false alarms and false detections, thereby reducing the risk of occurrence of dangers when the vehicle is running.

Figure 3:
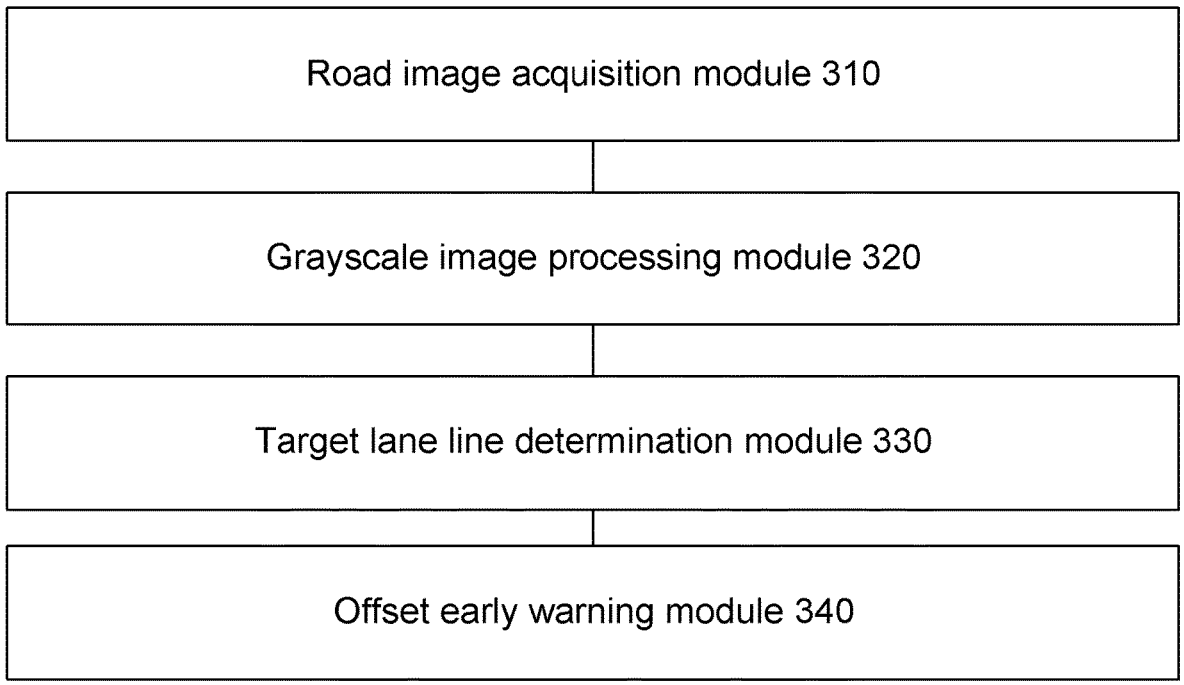
FIG. 3 illustrates a schematic structural diagram of an apparatus for early warning of vehicle offset according to an embodiment of the present disclosure.

With reference to FIG. 3, illustrated is a schematic structural diagram of an apparatus for early warning of vehicle offset according to an embodiment of the present disclosure, which specifically comprises: a road image acquisition module 310 configured to acquire collected road image to be detected from a sensor; a grayscale image processing module 320 configured to obtain a corresponding grayscale image by performing grayscale processing on the road image to be detected; a target lane line determination module 330 configured to determine a target lane line within the grayscale image; and an offset early warning module 340 configured to determine whether to issue an early warning of vehicle offset according to the target lane line and an early warning trigger condition.

In some embodiments, the target lane line determination module 330 comprises a near field-of-view region determination sub-module configured to determine a near field-of-view region of the grayscale image; a feature image extraction sub-module configured to extract a lane line feature image of the near field-of-view region; a target lane line acquisition sub-module configured to obtain the target lane line by fitting lane line features in the lane line feature image; and a target lane line angle acquisition sub-module configured to acquire a target lane line angle.

In some embodiments, the feature image extraction sub-module comprises a near field-of-view image interception sub-module configured to obtain a near field-of-view image by intercepting the near field-of-view region of the grayscale image; and a lane line feature image extraction sub-module configured to extract, through a steerable filter, the lane line feature image in the near field-of-view image.

In some embodiments, when the road image to be detected is a first frame image, the lane line feature image extraction sub-module comprises a gradient image generation sub-module configured to process the near field-of-view image to generate a gradient image; a feature angle acquisition sub-module configured to acquire multiple feature angles within the gradient image; and a first lane line image acquisition sub-module configured to input the multiple feature angles into the steerable filter, and process the near field-of-view image according to the steerable filter to obtain the lane line feature image.

In some embodiments, when the road image to be detected is not the first frame image, the lane line feature image extraction sub-module comprises a target lane line angle acquisition sub-module configured to acquire a target lane line angle acquired according to a road image to be detected in a previous frame; and the first lane line feature image acquisition sub-module configured to input the target lane line angle into the steerable filter, and process the near field-of-view image by the steerable filter to obtain the lane line feature image.

In some embodiments, the offset early warning module 340 comprises a first distance determination sub-module configured to determine a first distance between the vehicle and the target lane line according to the target lane line; and a first offset early warning sub-module configured to issue the early warning of vehicle offset when the first distance satisfies a first threshold distance condition.

In some embodiments, the apparatus further comprises a feature point extraction module configured to extract multiple feature points in the grayscale image; an entity object determination module configured to input the multiple feature points into a preset detector to determine entity object information; and a second offset early warning sub-module configured to determine a second distance between the vehicle and an entity object according to the entity object information, and issue the early warning of vehicle offset when the second distance satisfies a second threshold distance condition.

In the apparatus for early warning of vehicle offset according to the embodiments of the present disclosure, a collected road image to be detected is acquired, grayscale processing is performed on the road image to be detected to obtain a corresponding grayscale image, a target lane line in the grayscale image is determined, and it is determined whether to issue an early warning of vehicle offset according to the target lane line and an early warning trigger condition. Compared with the technical solutions in the related art, in the embodiments of the present disclosure, a target lane line in a running environment of the vehicle is considered in the embodiments of the present disclosure, which increases the accuracy of identification of lane lines in subsequent lane line identification, and reduces the frequency of false alarms and false detections, thereby reducing the risk of occurrence of dangers when the vehicle is running.

Figure 4:
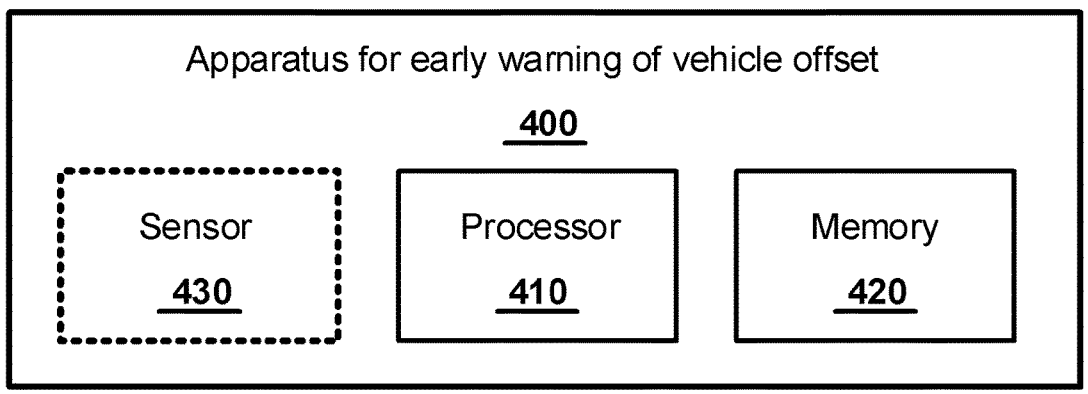
FIG. 4 illustrates a schematic diagram of a hardware structure of an apparatus for early warning of vehicle offset according to an embodiment of the present disclosure.

FIG. 4 illustrates a schematic diagram of a hardware structure of an apparatus for early warning of vehicle offset 400 according to an embodiment of the present disclosure.

As shown in FIG. 4, the apparatus for early warning of vehicle offset 400 may comprise a processor 410, a memory 420, and an optional sensor 430. It should be illustrated that the embodiment shown in FIG. 4 is for illustration of the present disclosure only, and thus is not intended to limit the present disclosure in any way. In fact, the apparatus for early warning of vehicle offset 400 may also comprise more, fewer, or different modules, and may be separate devices or distributed devices distributed across multiple positions. For example, the apparatus for early warning of vehicle offset 400 may comprise (but is not limited to) an in-vehicle infotainment system, a head unit, a Personal Computer (PC), a server, a server cluster, a computing cloud, a workstation, a terminal, a tablet, a laptop computer, a smart phone, a media player, a wearable device, and/or a home appliance (for example, a television, a set-top box, a DVD player), etc.

The processor 410 may be a component responsible for an overall operation of the apparatus for early warning of vehicle offset 400, and the processor 410 may be communicatively connected to other various modules/components to receive data to be processed and/or instructions from the other modules/components and to transmit processed data and/or instructions to the other modules/components. The processor 410 may be, for example, a general purpose processor, for example, a Central Processing Unit (CPU), a Digital Signal Processor (DSP), an Application Processor (AP), etc. In this case, the processor 410 may perform one or more of various steps of the method for early warning of vehicle offset according to the embodiment of the present disclosure according to instructions/programs/codes stored in the memory 420. Further, the processor 410 may also be, for example, a special purpose processor, for example, an Application Specific Integrated Circuit (ASIC), a Field Programmable Gate Array (FPGA), etc. In this case, the processor 410 may specifically perform one or more of various steps of the method for early warning of vehicle offset according to the embodiment of the present disclosure according to its circuit design. Further, the processor 410 may also be any combination of hardware, software, and/or firmware. Further, although only one processor 410 is shown in FIG. 4, in practice, the processor 410 may also comprise multiple processing units distributed across multiple positions.

The memory 420 may be configured to temporarily or persistently store computer executable instructions which, when executed by the processor 410, may cause the processor 410 to perform one or more of various steps of each method described in the present disclosure. In addition, the memory 420 may further be configured to temporarily or persistently store data related to these steps, such as road images, grayscale images, feature images, individual threshold data, etc. The memory 420 may comprise a volatile memory and/or a non-volatile memory. The volatile memory may comprise, for example (but not limited to), a Dynamic Random Access Memory (DRAM), a static RAM (SRAM), a synchronous DRAM (SDRAM), a cache, etc. The non-volatile memory may comprise, for example (but not limited to), a One-Time Programmable Read Only Memory (OT-PROM), a programmable ROM (PROM), an Erasable Programmable ROM (EPROM), an Electrically Erasable Programmable ROM (EEPROM), a mask ROM, a flash ROM, a flash memory (for example, an NAND flash, an NOR flash, etc.), a hard driver or a Solid State Driver (SSD), a Compact Flash (CF), a Secure Digital (SD), a micro-SD, a mini-SD, an extreme Digital (xD), a Multi-Media Card (MMC), a memory stick, etc. Further, the memory 420 may also be a remote storage device, for example, a Network Attached Storage device (NAS) etc. The memory 420 may also comprise distributed storage devices distributed across multiple positions, for example, a cloud memory.

The optional sensor 430 may comprise, for example, an image sensor which may be used to capture a road image. The image sensor may be, for example, a camera, a video camera, a webcam, an infrared camera, etc. which captures dynamic and/or static images. Although the sensor 430 is shown in FIG. 4 as a part of the apparatus for early warning of vehicle offset 400, in some other embodiments, an external sensor 430 may also be used. For example, the sensor 430 may be an image sensor used in an advanced driver assistance system.

In addition, the apparatus for early warning of vehicle offset 400 may further comprise other modules, comprising (but not limited to) a communication module, a power module, a GPS module, a sensor module (for example, a proximity sensor, an illuminance sensor, an acceleration sensor, a fingerprint sensor, etc.) etc.

However, it should be illustrated that the above-described modules are only a part of examples of modules which may be included in the apparatus for early warning of vehicle offset 400, and the electronic device according to the embodiment of the present disclosure is not limited thereto. In other words, the apparatus for early warning of vehicle offset 400 according to other embodiments of the present disclosure may comprise more modules, fewer modules, or different modules.

In some embodiments, the apparatus for early warning of vehicle offset 400 illustrated in FIG. 4 may perform various steps of each of the methods described in connection with FIGS. 1-3. In some embodiments, the memory 420 has stored thereon instructions which, when executed by the processor 410, may cause the processor 410 to perform various steps of each of the methods described in connection with FIGS. 1-3.

Further, in some embodiments, there is further proposed a vehicle, which may comprise the apparatus for early warning of vehicle offset 400 as shown in FIG. 4.

Various method embodiments described above are all described as combinations of a series of actions for the sake of brevity, but it should be understood by those skilled in the art that the present disclosure is not limited by an order of the actions described, since according to the present disclosure, some steps may be performed in other orders or at the same time. In addition, it should be understood by those skilled in the art that the embodiments described in the specification are only a part of the embodiments, and the actions and modules involved are not necessarily required in the present disclosure.

In another embodiment of the present disclosure, there is further discloses an electronic device, comprising a photographing apparatus configured to collect a road image to be detected; a processor; a memory having stored thereon instructions executable by the processor; wherein the processor is configured to perform any method for early warning of vehicle offset described above.

Various embodiments in the present specification are described in a progressive manner, each embodiment focuses on differences from other embodiments, and the same or similar parts among various embodiments may be known with reference to each other.

Finally, it should be illustrated that relational terms such as "first" and "second" etc. are used merely herein to distinguish one entity or operation from another entity or operation, and it is not necessarily required or implied that such an actual relationship or order exists between these entities or operations. Further, the terms "comprises", "includes" or any other variations are intended to encompass a non-exclusive inclusion, so that a process, method, commodity or device comprising a series of elements not only comprises these elements, but also comprises other elements which are not explicitly listed or elements which are inherent to such a process, method, commodity or device. Unless otherwise defined, an element defined by a phrase "comprising one . . . " does not exclude the presence of additional equivalent elements in a process, method, commodity or device comprising the element.

The method and apparatus for early warning of vehicle offset according to the present disclosure are described in detail above, and the principles and implementations of the present disclosure are described herein using specific examples. The description of the above embodiments is merely used to facilitate understanding the method according to the present disclosure and core ideas thereof. Further, those of ordinary skill in the art may make changes to the specific implementations and application scopes according to the idea of the present disclosure. In conclusion, contents of the specification are not to be construed as limiting the present disclosure.

I claim:

1. A method for early warning of vehicle offset, the method comprising:
- acquiring collected road image to be detected;
- obtaining a corresponding grayscale image by performing grayscale processing on the road image to be detected;
- determining a target lane line within the grayscale image; and
- determining whether to issue an early warning of vehicle offset according to the target lane line and an early warning trigger condition,
- wherein the step of determining a target lane line within the grayscale image comprises:
  - determining a near field-of-view region of the grayscale image;
  - extracting a lane line feature image of the near field-of-view region;
  - obtaining the target lane line by fitting lane line features in the lane line feature image; and
  - acquiring a target lane line angle,
- wherein the step of determining whether to issue an early warning of vehicle offset according to the target lane line and an early warning trigger condition comprises:
  - determining a first distance between the vehicle and the target lane line according to the target lane line; and
  - issuing the early warning of vehicle offset when the first distance satisfies a first threshold distance condition, and
- wherein after the step of determining a target lane line within the grayscale image, the method further comprises:
  - extracting multiple feature points in the grayscale image;
  - inputting the multiple feature points into a preset detector to determine entity object information; and
  - determining a second distance between the vehicle and an entity object according to the entity object information, and issuing the early warning of vehicle offset when the second distance satisfies a second threshold distance condition.

2. The method according to claim 1, wherein the step of extracting a lane line feature image in the near field-of-view region comprises:

obtaining a near field-of-view image by intercepting the near field-of-view region of the grayscale image; and extracting, through a steerable filter, the lane line feature image in the near field-of-view image.

3. The method according to claim 2, wherein the step of extracting a lane line feature image in the near field-of-view image when the road image to be detected is a first frame image comprises:

processing the near field-of-view image to generate a gradient image;

acquiring multiple feature angles within the gradient image; and inputting the multiple feature angles into the steerable filter, and processing the near field-of-view image by the steerable filter to obtain the lane line feature image.

4. The method according to claim 3, wherein the step of extracting a lane line feature image in the near field-of-view image when the road image to be detected is not the first frame image comprises:

acquiring a target lane line angle acquired according to a road image to be detected in a previous frame; and inputting the target lane line angle of the road image to be detected in the previous frame into the steerable filter, and processing the near field-of-view image by the steerable filter to obtain the lane line feature image.

5. The method according to claim 1, wherein the entity object information is the distance information between the entity object and the vehicle.

6. An apparatus for early warning of vehicle offset, comprising:

a processor;

a memory having stored thereon instructions which, when executed by the processor, cause the processor to:

acquire collected road image to be detected;

obtain a corresponding grayscale image by performing grayscale processing on the road image to be detected;

determine a target lane line within the grayscale image; and determine whether to issue an early warning of vehicle offset according to the target lane line and an early warning trigger condition, wherein the instructions, when executed by the processor, further cause the processor to:

determine a near field-of-view region of the grayscale image;

extract a lane line feature image of the near field-of-view region;

obtain the target lane line by fitting lane line features in the lane line feature image; and acquire a target lane line angle, wherein the instructions, when executed by the processor, further cause the processor to:

determine a first distance between the vehicle and the target lane line according to the target lane line; and issue the early warning of vehicle offset when the first distance satisfies a first threshold distance condition, and wherein the instructions, when executed by the processor, further cause the processor to:

extract multiple feature points in the grayscale image;

input the multiple feature points into a preset detector to determine entity object information; and determine a second distance between the vehicle and an entity object according to the entity object information, and issue the early warning of vehicle offset when the second distance satisfies a second threshold distance condition.

7. The apparatus according to claim 6, wherein the instructions, when executed by the processor, further cause the processor to:

obtain a near field-of-view image by intercepting the near field-of-view region of the grayscale image; and extract, through a steerable filter, the lane line feature image in the near field-of-view image.

8. The apparatus according to claim 7, wherein the instructions, when executed by the processor, further cause the processor to:

process the near field-of-view image to generate a gradient image;

acquire multiple feature angles within the gradient image; and input the multiple feature angles into the steerable filter, and process the near field-of-view image by the steerable filter to obtain the lane line feature image.

9. The apparatus according to claim 7, wherein the instructions, when executed by the processor, further cause the processor to:

acquire a target lane line angle acquired according to a road image to be detected in a previous frame; and input the target lane line angle into the steerable filter, and process the near field-of-view image by the steerable filter to obtain the lane line feature image.

10. A vehicle, comprising:

a sensor configured to collect a road image to be detected;

a processor communicatively coupled to the sensor;

a memory having stored thereon instructions which, when executed by the processor, cause the processor to:

acquire collected road image to be detected from the sensor;

obtain a corresponding grayscale image by performing grayscale processing on the road image to be detected;

determine a target lane line within the grayscale image; and determine whether to issue an early warning of vehicle offset according to the target lane line and an early warning trigger condition, wherein the instructions, when executed by the processor, further cause the processor to:

determine a near field-of-view region of the grayscale image;

extract a lane line feature image of the near field-of-view region;

obtain the target lane line by fitting lane line features in the lane line feature image; and acquire a target lane line angle, wherein the instructions, when executed by the processor, further cause the processor to:

determine a first distance between the vehicle and the target lane line according to the target lane line; and issue the early warning of vehicle offset when the first distance satisfies a first threshold distance condition, and wherein the instructions, when executed by the processor, further cause the processor to:

extract multiple feature points in the grayscale image;

input the multiple feature points into a preset detector to determine entity object information; and determine a second distance between the vehicle and an entity object according to the entity object information, and issue the early warning of vehicle offset when the second distance satisfies a second threshold distance condition.

11. The vehicle according to claim 10, wherein the instructions, when executed by the processor, further cause the processor to:
   obtain a near field-of-view image by intercepting the near field-of-view region of the grayscale image; and
   extract, through a steerable filter, the lane line feature image in the near field-of-view image.

12. The vehicle according to claim 10, wherein the instructions, when executed by the processor, further cause the processor to:
   process the near field-of-view image to generate a gradient image;
   acquire multiple feature angles within the gradient image; and
   input the multiple feature angles into the steerable filter, and process the near field-of-view image by the steerable filter to obtain the lane line feature image.

* * * * *